United States Patent [19]

Abell et al.

[11] 4,172,492
[45] Oct. 30, 1979

[54] APPARATUS FOR THE IN SITU INSPECTION OF TUBES WHILE SUBMERGED IN A LIQUID

[75] Inventors: Gary E. Abell, Norton; Louis Plavsity, Barberton; Frank J. Sattler, Copley, all of Ohio

[73] Assignee: The Babcock & Wilcox Company, New York, N.Y.

[21] Appl. No.: 842,010

[22] Filed: Oct. 13, 1977

[51] Int. Cl.² .................... F28F 11/00; G21C 17/00
[52] U.S. Cl. .................................. 165/11; 176/19 R
[58] Field of Search ............... 176/19 R; 174/14 R; 15/306 A; 34/23; 165/11

[56] References Cited

U.S. PATENT DOCUMENTS

| | | | |
|---|---|---|---|
| 2,037,047 | 4/1936 | Rosenberger | 15/306 A |
| 3,044,098 | 7/1962 | Stalson | 15/306 A |
| 3,216,858 | 11/1965 | Bogdawowski | 174/14 R |
| 3,243,560 | 3/1966 | Wilson | 174/14 R |
| 3,312,274 | 4/1967 | Sebald | 165/11 |
| 3,711,714 | 1/1973 | Klar et al. | 176/19 R |
| 3,766,005 | 10/1973 | Erkens | 176/19 R |
| 3,932,211 | 1/1976 | Loving, Jr. | 176/19 R |
| 3,954,136 | 5/1976 | Gugel | 165/11 |
| 4,047,103 | 9/1977 | Day et al. | 176/19 R |

Primary Examiner—Charles T. Jordan
Assistant Examiner—S. A. Cangialosi
Attorney, Agent, or Firm—John F. Luhrs; J. M. Maguire

[57] ABSTRACT

Apparatus for the in situ inspection of tubes which are submerged in a liquid such as the primary coolant of a nuclear reactor, wherein a sensor is withdrawn from a tube by a cable, including means for removing the liquid from and drying the cable and returning the liquid to the tubes thus preventing the spread of deleterious liquids to otherwise benign environments and the fouling of the drive mechanism used to control cable movements.

7 Claims, 3 Drawing Figures

APPARATUS FOR THE IN SITU INSPECTION OF TUBES WHILE SUBMERGED IN A LIQUID

This invention relates to an apparatus for the in situ inspection of tubes. More particularly it relates to apparatus for the in situ inspection of the tubes in a steam generator while submerged in the primary coolant from a nuclear reactor.

Such an inspection is ordinarily made by traversing the tubes with a sensor, such as an eddy current sensor, producing an electrical effect which changes when a defect appears in the tube. The sensor is usually attached to a flexible cable which serves to carry the electrical connections to the sensor and as a means for moving the sensor in the tube. While the sensor is being withdrawn from a tube at a constant speed, usually in the order of a few feet per minute, eddy current data in analog form is collected and recorded on receiving devices such as a magnetic tape or a strip chart recorder. Prior to or during recording, the data may be resolved into its horizontal and vertical components and converted to digital form to aid in the analysis thereof.

The safety factors relative to a nuclear installation dictate that the soundness of the tubes in a steam generator through which coolant from a reactor is circulated be periodically determined by inspection during service. Such inspections are most conveniently made while the reactor is being recharged with fuel. Because of the radio activity present in the reactor it is necessary that the transfer of spent fuel assemblies to a fuel storage pool, the transfer of new fuel assemblies from the storage pool to the reactor and the rearranging of fuel assemblies and control rods within the core be done with the reactor filled with the primary coolant. Because of the relative elevations of the reactor and steam generator, the latter is partially filled with primary coolant during the refueling operation. The presence of the reactor coolant in the tubes of the steam generator does not, per se, affect the eddy current examination; however, wetting of the sensor drive mechanism as the sensor is withdrawn from a tube causes slippage of the cable and consequently the data reliability is questionable. To avoid having the reactor coolant wetting and fouling the mechanical drive mechanism and carryover of the primary coolant, which is usually contaminated, it has been found necessary that the steam generator be drained of the primary coolant before proceeding with the tube inspection. This results in the inspection of the tubes being a critical path operation adding, as an order of magnitude, three to three and one half days to the down time of the unit. Loss of the availability of a typical power producing unit may cost a utility in the order of three hundred thousand dollars per day.

It is the primary object of this invention to provide an in situ inspection apparatus whereby, under the foregoing conditions, the inspection of the tubes of the steam generator, when partially filled with primary coolant, may be carried on in parallel with the refueling operation thereby materially reducing the down time of the power producing unit.

IN THE DRAWINGS

DETAILED DESCRIPTION

Figure 1:
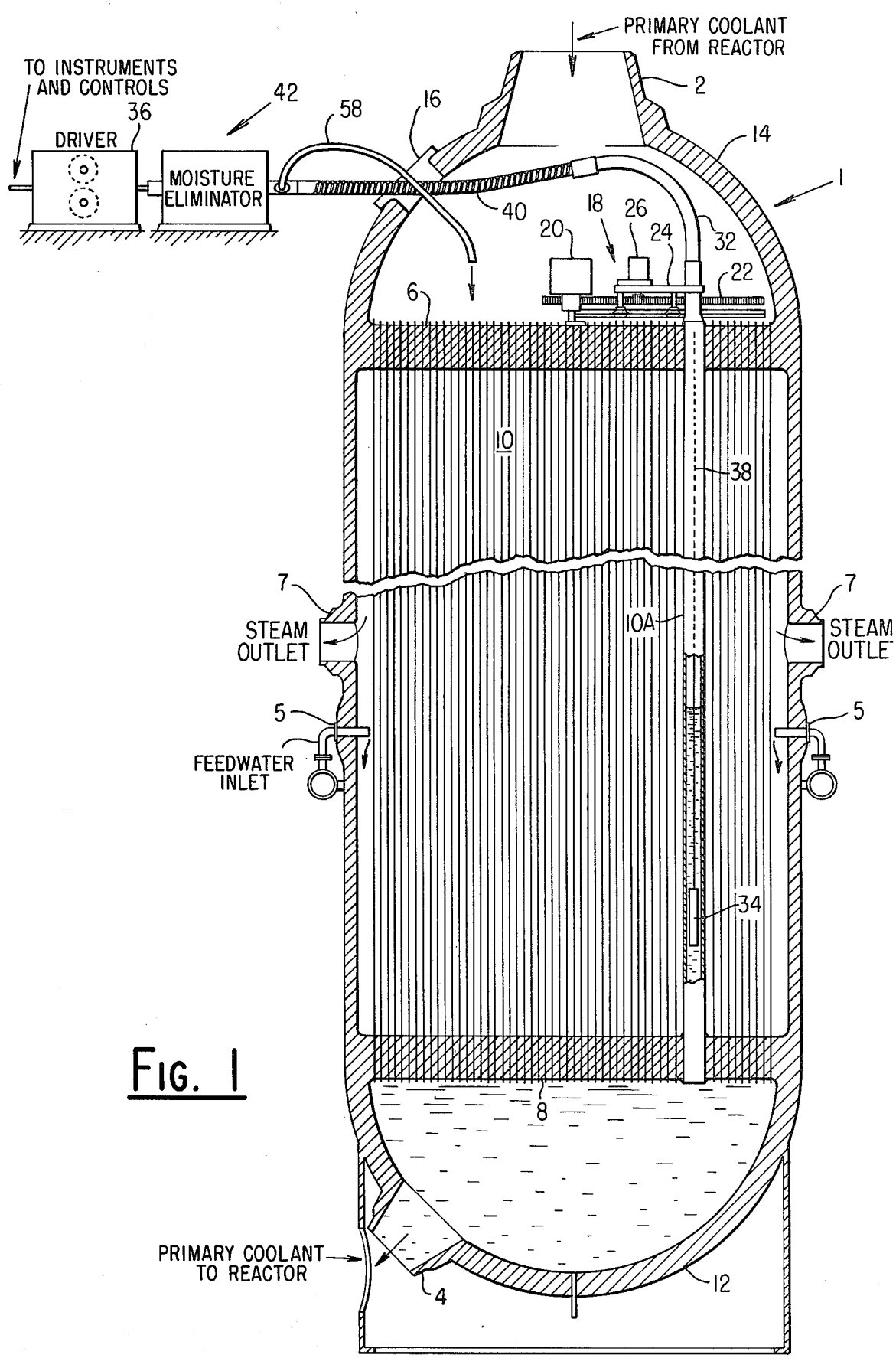
FIG. 1 is a schematic view.
Figure 3:
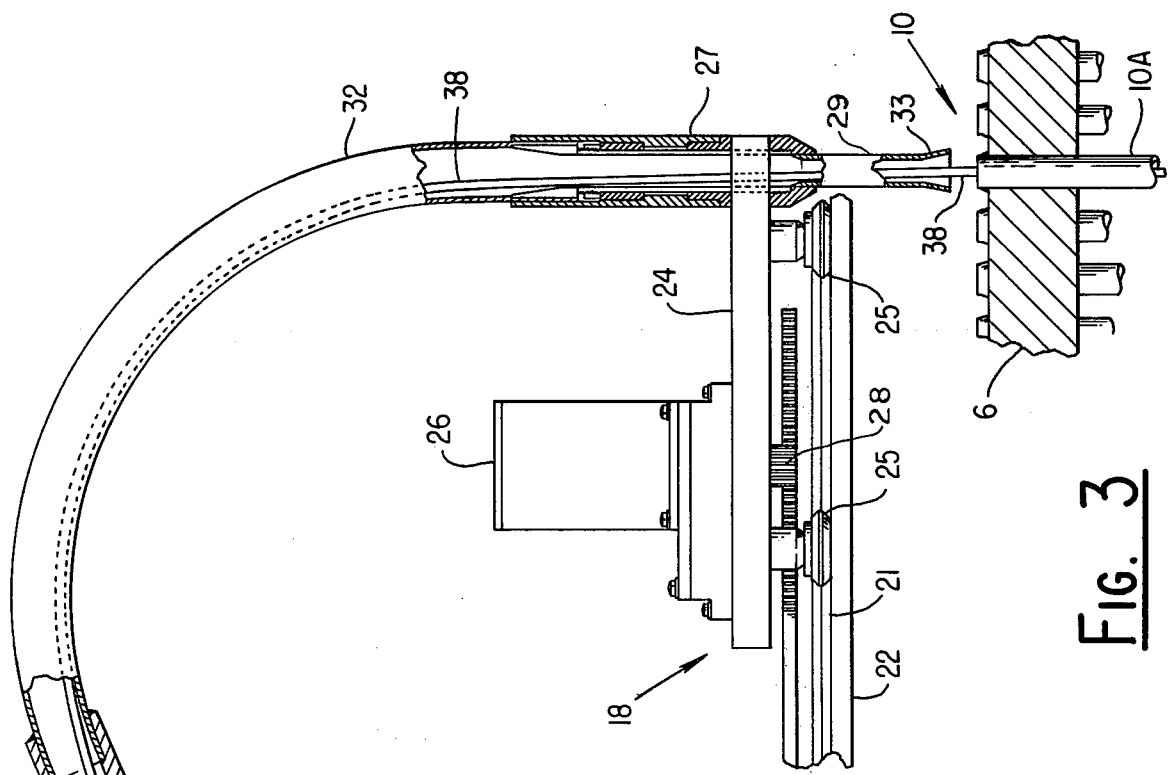
FIG. 3 is a fragmentary view of a manipulator used to position a sensor by remote means over a tube to be inspected.

Similar numerals refer to similar parts throughout the several views.

Referring now to the drawings, there is shown schematically a once through steam generator, generally indicated at 1, supplied with primary coolant from a nuclear reactor (not shown) through a nozzle 2 and provided with a nozzle 4 through which the coolant is discharged for return to the reactor. Feedwater is admitted to the steam generator through ports such as shown at 5 and the generated steam discharged through ports as shown at 7. Positioned in the generator by means of tube sheets 6 and 8 and the usual support plates (not shown) are a plurality of tubes, generally indicated at 10 through which the primary coolant flows. A typical steam generator of the tpye shown may include upwards of sixteen thousand tubes each having an OD of approximately 0.625 inches, a wall thickness of approximately 0.034 inches and a length of approximately sixty feet. During an outage for fuel reloading it is customary to perform an inspection on three percent of the total number of tubes, selected in accordance with a pre-determined pattern.

As an aid in describing the invention there is shown in FIG. 1, one tube identified as tube 10A, to enlarged size. During a refueling operation the lower hemispherical head 12 is completely filled with primary coolant and the tubes, as shown, partially filled to a level determined by the relative elevations of the reactor and steam generator.

During the refueling operation there is installed in the upper cylindrical head 14, through a manway 16, a sensor manipulator generally indicated at 18 comprising an arm 22 supported at substantially the center of the steam generator and including a servomotor 20 whereby the arm can be rotated in forward and reverse directions through three hundred sixty degrees. A carriage 24, supported on the arm through rollers 25 engaging ways 21 on the arm is radially movable along the arm toward and away from the center of the steam generator by means of a servomotor 26 and rack and pinion gears 28. Removably secured to the carriage 24 is a fitting 27 receiving at its lower end a guide tube 29, having a bell mouth 33 and at its upper end a ridged gooseneck 32. It is evident that by operation of servomotores 20, 26 the bell mouth 33 may be brought into line with any one of the tubes 10 selected for inspection.

Taking as an example the tube 10A, a sensor 34 is lowered a predetermined distance into the tube by paying out, by means of a reversible motor operated drive unit 36, a cable 38 enclosed in a flexible conduit 40, connected to and carrying the electrical leads to the sensor. After the sensor has reached the lower limit of travel, the drive unit 36 is reversed and the sensor withdrawn upwardly at a predetermined speed through the tube. During the withdrawal, the electrical effect produced by the sensor is transmitted to such instruments as are required for analysis. Such instruments and the controls for the servomotors 20, 26 and drive unit 36 for convenience and safety are preferably located away from the usual hostile environment in and around the steam generator 1.

As schematically illustrated in FIG. 1 the surface of the sensor 34 and cable 38 is wetted by the primary coolant in the tube 10A. To prevent the primary coolant adhering to the cable 38 from interferring with the operation of the drive unit 36 and spreading contamination beyond the steam generator, there is inserted in the flexible conduit 40, between the goose neck 32 and drive unit 36, a surface moisture eliminator unit, generally indicated at 42 which serves to return the reactor coolant adhering to the surface of cable 38 to steam generator 1, thus drying and decontaminating the cable before passing to the drive unit 36.

Figure 2:
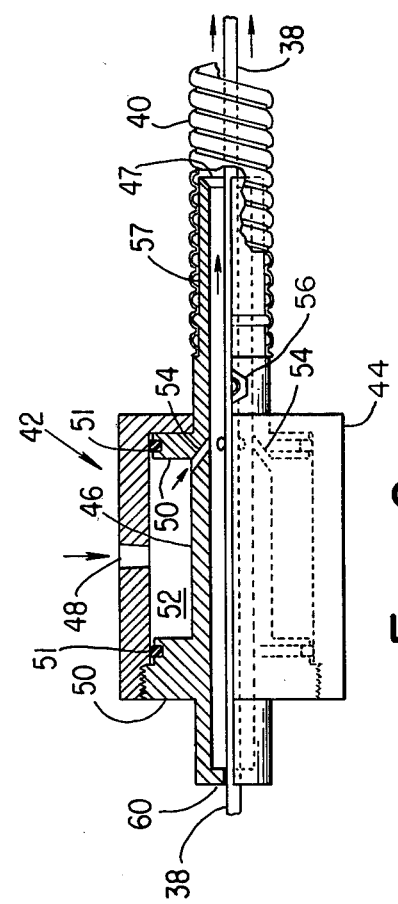
FIG. 2 is a drawing illustrating the construction of a surface moisture eliminator used in an embodiment of the present invention.

As shown in FIG. 2 the unit 42 comprises a cylindrical housing 44 in which is located a spool piece 46 having an axial passageway 47 through which the cable 38 passes and which may be considered an extension of the conduit 40. The flanges 50 of the spool piece carry O-Ring gaskets 51 to form a pressure tight plenum chamber 52 to which a drying medium, such as air under pressure, is admitted through an inlet 48. The drying medium is discharged from the plenum chamber through a plurality of ports 54 into the passageway 47 along the cable 38. As shown, the ports 54 are at an acute angle with respect to the center line of passageway 47 so that the jets of drying medium issuing therefrom have a substantial component of flow along the cable 38 thereby blasting away the reactor coolant adhering thereto and drying the surface of cable 38. Substantially all of the reactor coolant removed from the cable 38 is carried by the air stream through the conduit 40 and discharged through the bell mouth 33 into the steam generator 1. Coolant which may collect within the passageway 47 is returned to the steam generator 1 through a port 56 and drain line 58.

The unit 42, as shown, is provided with a nipple 57 receiving the conduit 40 and a baffle 60 to eliminate blow back of the drying medium in opposite direction from that desired.

We claim:

1. In a nuclear steam generator having a vertical tube open at the upper and lower ends for the flow of reactor coolant therethrough, apparatus for the in-situ testing of the integrity of the tube during an outage of the generator while said tube contains reactor coolant, comprising in combination a sensor disposed within said tube producing an electrical effect corresponding to changes in the integrity of the tube as said sensor traverses said tube, a cable connected to said sensor running through said tube and out the upper open end to a driver unit located remote from the generator for paying in and paying out said cable to thereby cause said sensor to traverse said tube in up and down directions respectively, a conduit through which said cable is enclosed between the driver unit and said tube, said conduit having an open end adjacent the upper open end of said tube and means introducing a flow of drying medium into said conduit adjacent said drive unit which is discharged through the open end of said conduit to thereby remove coolant adhering to the surface of said cable as the driver unit pays in said cable and draws said sensor up through said tube.

2. Apparatus as set forth in claim 1 wherein said last named means comprises a plenum chamber through which said conduit passes, an inlet port in a wall of said plenum chamber for introducing the drying medium under pressure into said chamber, and a discharge port in the wall of said conduit through which the drying medium is discharged from the plenum chamber into said conduit.

3. Apparatus as set forth in claim 2 further including a plurality of ports through which the drying medium is discharged into said conduit from said plenum chamber.

4. Apparatus as set forth in claim 3 wherein said drying medium is compressed air.

5. Apparatus as set forth in claim 2 wherein said port in said conduit is disposed at an acute angle to thereby discharge a jet of drying medium producing a component of flow along said cable in the direction of the open end of said conduit.

6. Apparatus as set forth in claim 5 further including a port in said conduit adjacent to said plenum chamber and a tube connected to said port for returning collected coolant to within the steam generator.

7. Apparatus as set forth in claim 1 wherein the steam generator comprises a vertical cylindrical shell having a plurality of vertical tubes arranged concentrically about the center of said shell and held in position by an upper and a lower tube sheet, further including a horizontal arm rotatably mounted on the upper tube sheet at the center of said shell, a first servomotor for rotating said arm clockwise and counterclockwise, a carriage riding on said arm, a second servomotor for positioning said carriage toward and away from the center of said shell and means carried by said carriage holding said conduit adjacent to the open end thereof whereby said conduit can be brought into line with any one of said plurality of tubes by operation of said first and second servomotors.

* * * * *